United States Patent
Drake

(10) Patent No.: US 8,301,470 B1
(45) Date of Patent: Oct. 30, 2012

(54) METHOD AND COMPUTER-READABLE MEDIUM FOR ADMINISTERING AN INSURANCE POLICY PREMIUM PAYMENT DEFERRAL PLAN

(75) Inventor: Jeffrey S. Drake, Carmel, IN (US)

(73) Assignee: American United Life Insurance Company, Indianapolis, IN (US)

( * ) Notice: Subject to any disclaimer, the term of this patent is extended or adjusted under 35 U.S.C. 154(b) by 273 days.

(21) Appl. No.: 12/759,399

(22) Filed: Apr. 13, 2010

Related U.S. Application Data

(60) Provisional application No. 61/168,785, filed on Apr. 13, 2009.

(51) Int. Cl.
*G06Q 40/00* (2006.01)
(52) U.S. Cl. .......................................... 705/4
(58) Field of Classification Search ................. 705/4
See application file for complete search history.

(56) References Cited

U.S. PATENT DOCUMENTS

| | | | | |
|---|---|---|---|---|
| 4,839,804 | A * | 6/1989 | Roberts et al. | 705/36 R |
| 5,956,691 | A * | 9/1999 | Powers | 705/4 |
| 7,809,588 | B1 * | 10/2010 | Solis et al. | 705/4 |
| 7,809,589 | B1 * | 10/2010 | Solis et al. | 705/4 |
| 7,814,006 | B1 * | 10/2010 | Solis et al. | 705/38 |
| 7,945,513 | B2 * | 5/2011 | Weiss et al. | 705/39 |
| 8,108,298 | B2 * | 1/2012 | Tatro et al. | 705/37 |
| 2002/0173995 | A1 * | 11/2002 | Schiminovich | 705/4 |
| 2004/0030589 | A1 * | 2/2004 | Leisher et al. | 705/4 |
| 2005/0010453 | A1 * | 1/2005 | Terlizzi et al. | 705/4 |
| 2007/0094053 | A1 * | 4/2007 | Samuels | 705/4 |
| 2008/0040166 | A1 * | 2/2008 | Foti et al. | 705/4 |
| 2008/0319900 | A1 * | 12/2008 | Schiminovich | 705/40 |
| 2009/0018873 | A1 * | 1/2009 | Ramos et al. | 705/4 |
| 2009/0030737 | A1 * | 1/2009 | Weiss | 705/4 |
| 2009/0030738 | A1 * | 1/2009 | Golembiewski | 705/4 |
| 2009/0030739 | A1 * | 1/2009 | Tatro et al. | 705/4 |
| 2009/0132300 | A1 * | 5/2009 | Weiss et al. | 705/4 |
| 2009/0132430 | A1 * | 5/2009 | Weiss | 705/36 R |

* cited by examiner

*Primary Examiner* — Kenneth Bartley
(74) *Attorney, Agent, or Firm* — Ice Miller LLP

(57) ABSTRACT

Method and computer-readable medium for administering an insurance policy premium payment deferral plan are disclosed. According to one embodiment of the disclosure, a method for administering an insurance policy premium payment deferral plan that maintains an insurance policy in effect while permitting deferment of premium payments owed under the policy includes determining whether a policy is eligible for a premium deferral. The method also includes automatically producing a notification for the policy if the policy is eligible for the premium deferral. The method further includes determining whether the premium deferral has been selected if the insurance policy is eligible for the premium deferral. The method also includes automatically deferring an insurance premium payment if the insurance policy is eligible for the premium deferral and the premium deferral is selected.

17 Claims, 5 Drawing Sheets

METHOD AND COMPUTER-READABLE MEDIUM FOR ADMINISTERING AN INSURANCE POLICY PREMIUM PAYMENT DEFERRAL PLAN

CROSS REFERENCE TO RELATED APPLICATION

This application claims the benefit of and incorporates by reference herein the disclosure of U.S. Ser. No. 61/168,785, filed Apr. 13, 2009.

BACKGROUND

Fixed premium participating whole life insurance is a form of permanent life insurance that has been used throughout the world. This form of permanent life insurance involves the policyholder paying to the insurance company fixed premiums in exchange for life insurance and the potential for dividends. As per its terms, the insurance policy may develop cash values, which are available to the policyholder. Should the policyholder wish to terminate the policy when the policy has cash value, this cash value is returned to the policyholder. Before accumulation of cash value in a policy, a termination of the policy results in no cash value return to the policyholder. After cash value has accumulated, the policyholder may receive part of the cash value through a policy loan while keeping the insurance coverage in force.

The cash value of the policy can also be used by the policyholder as the collateral for a policy loan. A policy loan reduces the net policy value provided by the policy in terms of both net death benefit and net cash value. At policy termination, either through death or surrender, the policy loan is deducted from the death benefit or calculated policy cash value. This policy loan feature also provides the policyholder with flexibility to take a loan against existing cash value. In addition to using the policy loan for anything that the policyholder desires, the loan proceeds can be used to pay a currently due fixed premium. When the policyholder is able to pay back the policy loan, the total cash value of the policy is restored.

As noted above, a fixed premium participating whole life insurance policy provides the policyholder with some degree of flexibility in payment of the fixed premiums once the policy develops cash value. However, prior to the point of the policy developing cash value, the policy of a policyholder who cannot make the required fixed premiums within the grace period of the policy would lapse.

During difficult economic times and hardships, life insurance policyholders may be faced with difficult decisions regarding the expenditure of money. In some circumstances, policyholders may be forced to skip paying premiums for their life insurance policy in order to pay for essential life needs. As noted above, this payment skip typically results in the lapsing of life insurance coverage. Thus, there is a need to accommodate such policyholders to allow them to keep their policies alive in some manner.

Some insurance companies have historically implemented no-lapse guarantees in various manners for flexible premium life insurance. Two types of no-lapse guarantees generally found in the life insurance industry today include alternative specified premium and shadow account. The purpose of these no-lapse guarantee features is to keep the policy in force if there is insufficient account value. The alternative specified premium or shadow account will keep the coverage in force if conditions are met and the account value is insufficient.

SUMMARY

The present disclosure discloses a method and computer-readable medium for administering an insurance policy premium payment deferral plan. According to one embodiment of the disclosure, a method of administering an insurance policy premium payment deferral plan that maintains an insurance policy in effect while permitting deferment of premium payments owed under the policy includes determining by utilizing a computer whether a policy is eligible for a premium deferral. The step of determining whether a policy is eligible for a premium deferral includes accessing one or more computer databases containing an issue date of the policy, computing whether the issue date of the policy is within a predetermined first time frame prior to a calculation date, and computing whether a predetermined amount of premiums has been paid within a predetermined second time frame of the calculation date. According to this embodiment, the method also includes automatically producing a notification for the policy if the policy is eligible for the premium deferral. The insurance policy may be eligible for the premium deferral if the issue date of the insurance policy is within the predetermined first time frame prior to the calculation date and the predetermined amount of premiums has been paid for the predetermined second time frame prior to the calculation date. The method further includes determining whether the premium deferral has been selected if the insurance policy is eligible for the premium deferral and automatically deferring an insurance premium payment if the insurance policy is eligible for the premium deferral and the premium deferral is selected. The step of automatically deferring an insurance premium payment includes adjusting a payment schedule for the insurance policy by rescheduling the insurance premium payment and maintaining the insurance policy such that the insurance policy does not lapse.

In another embodiment of the disclosure, a method of administering an insurance policy premium payment deferral plan that maintains an insurance policy in effect while permitting deferment of premium payments owed under the policy includes automatically determining whether a policy has entered a grace period for payment of a premium and, if the policy has entered the grace period, determining by utilizing a computer whether the policy is eligible for a premium deferral. The step of determining whether the policy is eligible for a premium deferral includes accessing one or more computer databases containing an issue date of the policy, computing whether the issue date of the policy is within a predetermined first time frame prior to a calculation date, and computing whether a predetermined amount of premiums has been paid within a predetermined second time frame of the calculation date. The method of premium deferral also includes automatically producing a notification for the policy if the policy is eligible for the premium deferral. The insurance policy may be eligible for the premium deferral if the issue date of the insurance policy is within the predetermined first time frame prior to the calculation date and the predetermined amount of premiums has been paid for the predetermined second time frame prior to the calculation date. The method further includes determining whether the premium deferral has been selected if the insurance policy is eligible for the premium deferral and automatically deferring an insurance premium payment if the insurance policy is eligible for the premium deferral and the premium deferral is selected. The step of automatically deferring an insurance premium payment includes adjusting a payment schedule for the insurance policy by rescheduling the insurance premium payment and maintaining the insurance policy such that the insurance policy does not lapse.

In an embodiment of a computer-readable medium including a computer program for administering an insurance policy premium payment deferral plan that maintains an insurance policy in effect while permitting deferment of premium payments owed under the policy, the code portions stored therein include a first executable portion for computing whether a policy is eligible for a premium deferral, wherein the first executable portion is configured for accessing a database containing an issue date of the policy, computing whether the issue date of the policy is within a predetermined first time frame prior to a calculation date, and computing whether a predetermined amount of premiums has been paid within a predetermined second time frame prior to the calculation date. The code portions within the computer-readable medium further include a second executable portion for producing a notification for the policy if the policy is eligible for the premium deferral. The insurance policy may be eligible for the premium deferral if the issue date of the insurance policy is within the predetermined first time frame prior to the calculation date and the predetermined amount of premiums has been paid for the predetermined second time frame prior to the calculation date. The code portions within the computer-readable medium further include determining whether the premium deferral has been selected if the insurance policy is eligible for the premium deferral and automatically deferring an insurance premium payment if the insurance policy is eligible for the premium deferral and the premium deferral is selected. The code portions within the computer-readable medium further include adjusting a payment schedule for the insurance policy by rescheduling the insurance premium payment and maintaining the insurance policy such that the insurance policy does not lapse.

BRIEF DESCRIPTION OF THE DRAWINGS

The features and advantages of this disclosure, and the manner of attaining them, will be more apparent and better understood by reference to the following descriptions of the disclosed method and computer-readable program, taken in conjunction with the accompanying drawings, wherein.

DETAILED DESCRIPTION

Figure 1:
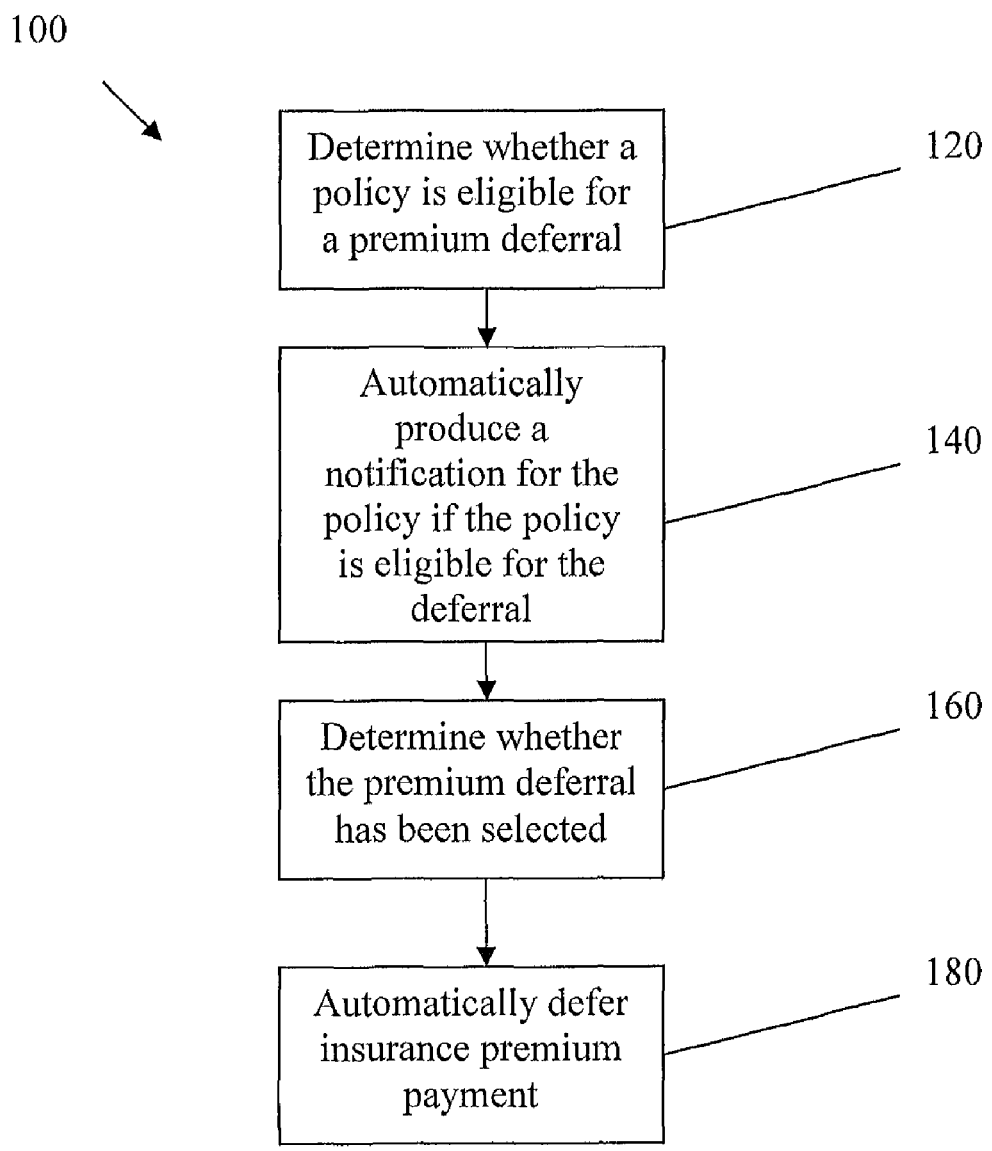
FIG. 1 shows a method of administering an insurance policy premium payment deferral plan according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Generally, the present disclosure includes a method that determines when fixed premiums under a participating whole life insurance can be deferred, such as when no cash value of the policy has yet to accrue. In other words, the present disclosure provides flexibility in payment of premiums for fixed premium participating whole life insurance, such as to accommodate policyholders in difficult economic circumstances. It should be noted that the present disclosure may equally apply to non-participating life insurance and non-permanent types of life insurance such as term life insurance (including Return of Premium Term) and to health and long-term care insurance. Furthermore, it should also be noted that typically each of the steps described herein may be executed or monitored automatically but one or more of the steps may be manually monitored or executed.

As shown in FIG. 1, a method of administering an insurance policy premium payment deferral plan 100 includes determining whether a policy is eligible for a premium deferral 120, automatically producing a notification for the policy if the policy is eligible for the premium deferral 140, determining whether the premium deferral has been selected 160, and automatically deferring the insurance premium payment if the insurance policy is eligible and if the premium deferral has been selected 180.

Typically, insurance companies utilize one or more computer databases to store information regarding policyholders. For example, a computer database may contain, among other things, account information, the issue date of each policy, the current cash value of the account, and the payment history of the policyholder. As described below, using the present method and this information, an insurance company and the like may determine whether a policyholder is eligible for deferring a premium payment.

Figure 2A:
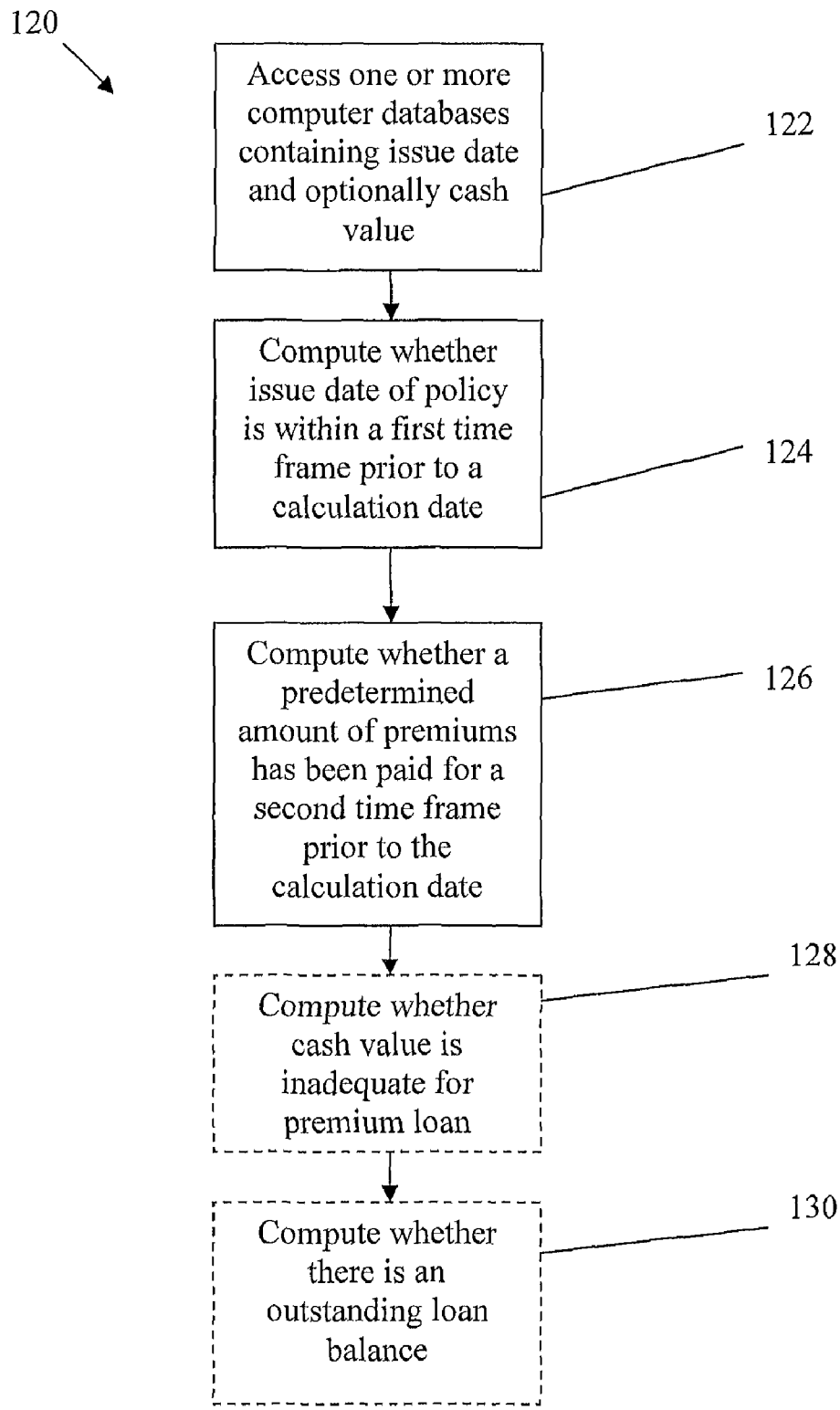
FIG. 2a shows details of the step of determining whether a policy is eligible for the premium deferral of the methods of FIG. 1 and FIG. 3.

In order to be eligible for a premium payment deferral, a set of eligibility requirements needs to be satisfied. FIG. 2a shows an example of the steps that may be followed in order to determine whether a policy is eligible for a premium deferral (block 120 of FIG. 1). As shown in FIG. 2a, the computer databases containing the issue date of the policy and optionally the cash value are accessed 122. Using the information from the computer databases, the method 100 of the present disclosure can compute whether the issue date of the policy is within a first time frame prior to a calculation date 124. If the policy falls outside of this first time frame, then the policy is typically not eligible for premium deferral. The first time frame may be one of various time spans, such as at least a number of days, weeks, months, etc., e.g., twelve months, and no more than a number of days, weeks, months, etc., e.g., four years. Typically, the calculation date is the current date of determining eligibility. However, the calculation date may be any date, such as, for example, two weeks from the current date and the like.

With the information accessed from the computer databases, the method 100 can also compute whether a predetermined amount of premiums has been paid for a second time frame prior to the calculation date 126. If the predetermined amount of premiums has not been paid, then typically the policy would not be eligible for premium deferral. The predetermined amount may be one of various values, such as, for example, 100% of premiums, 80% of premiums, and the like. The predetermined amount may also be dependent upon the second time frame. For example, if the second time frame is 6 months, then the predetermined amount may be 80% of premiums. If the second time frame is 36 months, the predetermined amount may be 65% of premiums. Alternatively, the predetermined amount may be progressive. For example, for 6 months, the predetermined amount may be 80% and for 6 to 12 months, the predetermined amount may be 70%. Optionally, the method 100 may also compute whether cash value is inadequate for a premium loan 128. In other words, the policy may not typically be eligible for a premium deferral if the policy has adequate cash value to exercise an automatic premium loan. Optionally, the method 100 may also compute whether there is an outstanding loan balance 130. That is to say, the policy may not typically be eligible for a premium deferral if that policy has an outstanding loan balance.

While the eligibility requirements of method 100 described above included three steps (122, 124, 126), the eligibility of a policy for premium deferral may be based on one of these steps or on other requirements. Of course, the insurance policy would then be eligible for a premium deferral based on the new set of requirement(s). Also, in order to determine the eligibility of a policy for a premium deferral, the policy may be required to be in a grace period for payment. For instance, when a policy enters a grace period for payment of a premium, the present method may automatically determine whether the policyholder is eligible for a deferral.

Any and all of the eligibility information (and election of deferral information) may be communicated to insurance company service personnel, insurance producers, policyholders, and the like. Furthermore, it should be noted that the eligibility (and election of deferral, if applicable) information may be communicated to and impact various output systems such as illustration systems and administration systems, including billing, reporting, claims, and loan.

After determining premium deferral eligibility, the method 100 then provides notice to the electronic files of the insurance company, directly to a policyholder, and/or various individuals or entities using various modes of communication (e.g., e-mail, post mail). As shown in FIG. 1, the method 100 includes automatically producing a notification if the policy is eligible for the premium deferral 140. The information included in the notification may include the time within which the premium deferral may be elected, when the premium deferral will be automatically elected, and the like.

Figure 2B:
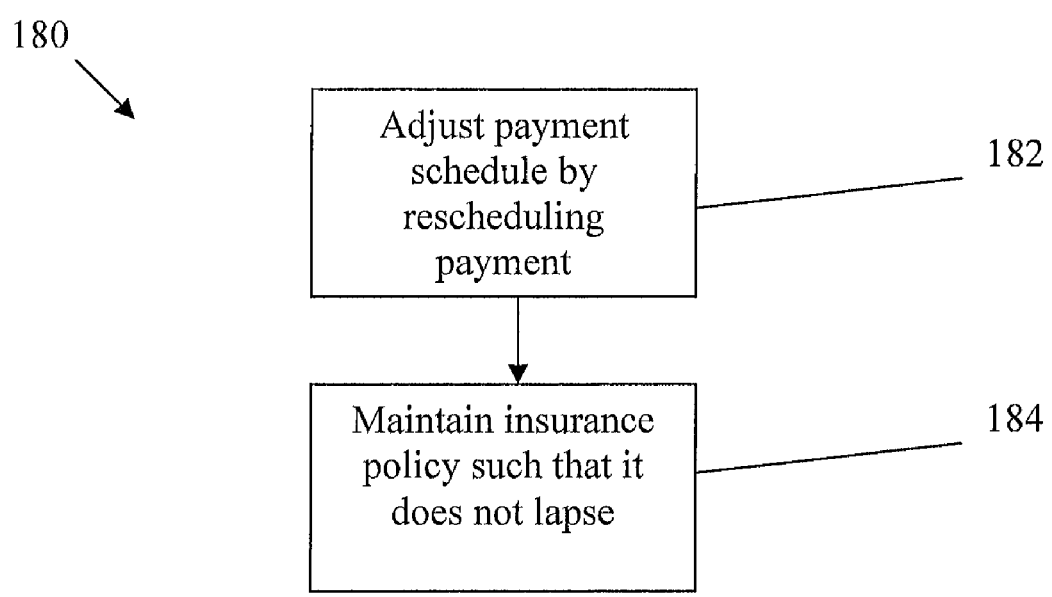
FIG. 2b shows details of the step of automatically deferring an insurance premium payment of the methods of FIG. 1 and FIG. 3.

After providing notification, the method 100 determines whether the premium deferral has been selected 160, such as by checking the databases for an election by a policyholder and the like. After determining whether the premium deferral has been selected 160, the method 100 automatically defers the insurance premium payment if the insurance policy meets the eligibility requirements and if the premium deferral has been selected 180. As shown in FIG. 2b, the automatic deferment 180 includes adjusting a payment schedule by rescheduling the premium payment 182 and maintaining the insurance policy such that the insurance policy does not lapse 184.

After deferring a premium payment, the policyholder may be required to repay in full or make partial repayment of any premium that is deferred plus accrued interest. The payment of this deferred premium may occur in any manner, such as through a detailed payment plan. After a specified date, e.g., fourth anniversary of the policy, the method of the present disclosure may convert the unpaid premium payments and interest to a policy loan.

Figure 3:
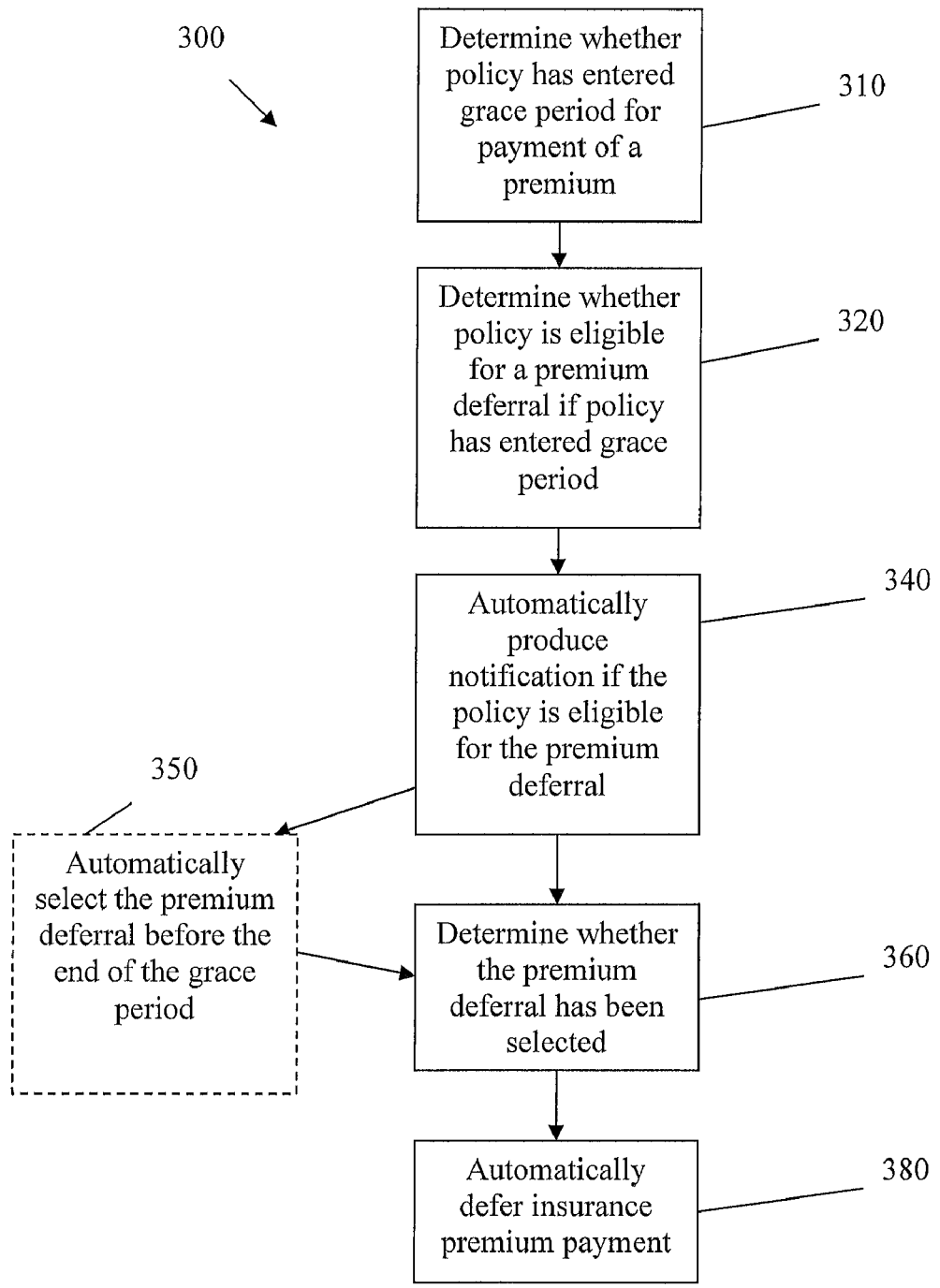
FIG. 3 shows a method of administering an insurance policy premium payment deferral plan according to another embodiment of the present disclosure.

In another embodiment, as shown in FIG. 3, a method for administering an insurance policy premium payment deferral plan 300 includes determining whether a policy has entered a grace period for a payment of a premium 310, determining whether a policy is eligible for a premium deferral if the policy has entered grace period 320, and automatically producing a notification if the policy is eligible for the premium deferral 340. Optionally, the method 300 may also include automatically selecting the premium deferral before the end of the grace period 350. The method 300 also includes determining whether the premium deferral has been selected 360 and automatically deferring the insurance premium payment if the policy is eligible for the premium deferral and the premium deferral has been selected 380. The description of the steps of method 100 detailed above may also apply to method 300.

Generally, a policyholder may be required to give notice of electing the deferral before the grace period ends, such as at least 7 days before the period ends. As noted above, in some instances, the deferral may automatically occur upon certain occurrences, such as the last day of the grace period. See, for example, FIG. 3 where the method 300 optionally includes the step of automatically selecting the premium deferral before the end of the grace period 350.

Figure 4:
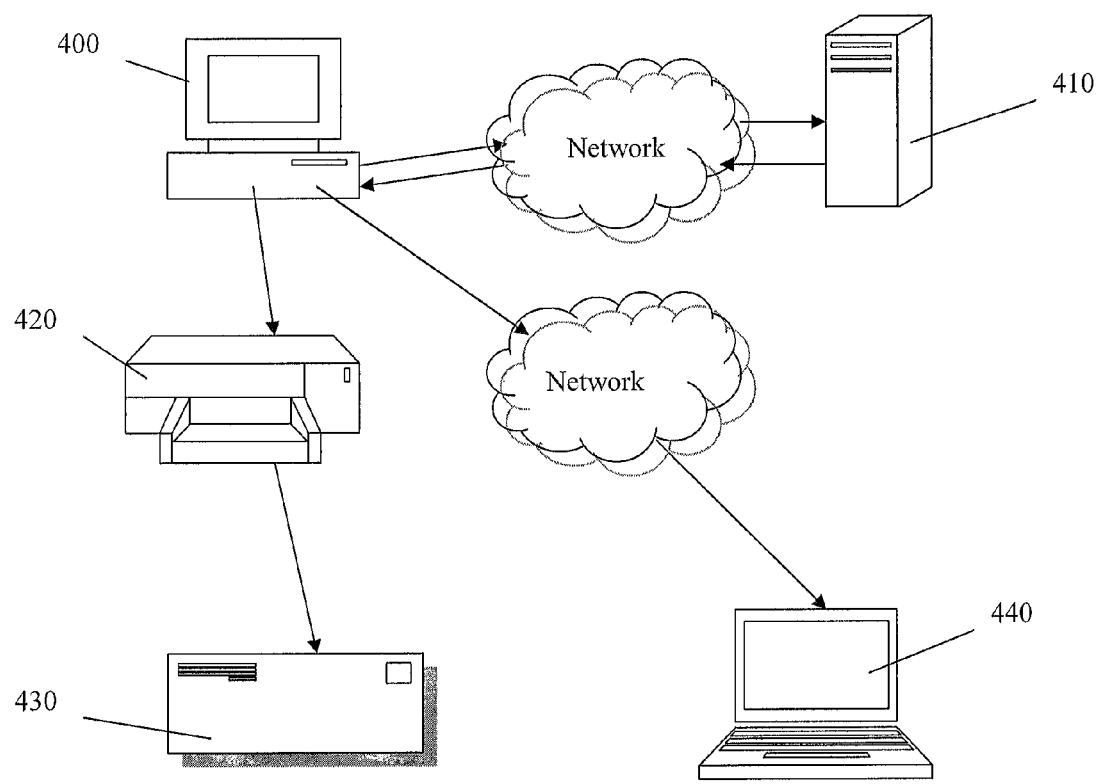
FIG. 4 illustrates the step of producing a notification for a policy if the policy is eligible for deferral according to at least one embodiment of the present disclosure.

As shown in FIG. 4, a computer 400 running a program including the method of the present disclosure may automatically monitor the policy computer database of an insurance company 410 via a network. If the computer 400 determines that, for example, policy A in the policy computer database 410 meets all of the eligibility requirements, then when an insurance clerk accesses policy A using a computer, the clerk will be notified of this deferral option. The clerk may be notified in various ways, such as an electronic indicator on the computer screen, a sound generated by the computer, etc. Of course, the clerk may be notified in other ways such as by automatically printing a notification when eligibility is reached. In addition or alternatively, as shown in FIG. 4, a method of the present disclosure may generate notifications to be sent directly to policyholders' computers 440 via email (using a network to connect to a policyholder's email account and/or computer), by regular mail 430 (after printing a notice using a printer 420 connected to a computer having access to the results of the computer program), or the like. In one embodiment, once a policyholder's policy enters the grace period for paying a premium, an email or letter may automatically be generated to alert the policyholder of the opportunity to defer the premium payment. It should be further noted that the devices shown in FIG. 4, as well as other related devices such as other computers, mobile devices, etc., may be connected to one another using one or more networks, cable, or other manner of linking devices.

Upon deferring a premium payment, the method of the present disclosure may change the premium payment mode from yearly to monthly, or the like. A premium payment may be deferred more than once for an insurance policy. As such, more than one notice may be emailed or mailed to a policyholder and the like as long as the eligibility requirements are met. The method of the present disclosure may set a maximum number of deferrals, such as three quarterly premiums within the first four policy years and each may be required to meet the benefit requirements. Therefore, if the maximum number of deferrals has been attained, the method of the present disclosure may discontinue actively monitoring that particular policy and, consequently, discontinue producing notifications.

The method of the present disclosure may terminate at the earliest of the conversion of any deferred premiums to a policy loan, the end of the grace period, the fourth policy anniversary, the date the policy terminates, the receipt by the insurance company of a written request for termination of program, or the like. The premium deferral method may be reinstated in some circumstances. In one embodiment of the present disclosure, however, the premium deferral method may not be reinstated upon termination.

A computer medium, such as a business rule management system or the like, may comprise the steps of the method of premium deferral described herein. For instance, the eligibility requirements may be incorporated into a computer program that can monitor the accounts of policyholders and thereby determine for whom and when a premium deferral is possible. The computer program may be generated in any software language such as COBOL, C++, or the like.

While this disclosure has been described as having various embodiments, these embodiments according to the present disclosure can be further modified within the scope and spirit of this disclosure. This application is therefore intended to cover any variations, uses, or adaptations of the disclosure using its general principles. For example, any methods disclosed herein and in the appended documents represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A method for administering an insurance policy premium payment deferral plan that maintains an insurance policy in effect while permitting deferment of premium payments owed under the policy, the method comprising:
   determining by utilizing a computer whether an insurance policy is eligible for a premium deferral comprising:
      accessing one or more computer databases containing an issue date of the insurance policy, a predetermined first time frame, a predetermined second time frame, and premium payment data;
      computing whether the issue date of the insurance policy is within the predetermined first time frame prior to a premium deferral determination time; and
      computing the amount of premiums paid within the predetermined second time frame prior to the premium deferral determination time using the premium payment data;
   automatically producing a notification of eligibility for the insurance policy if the insurance policy is eligible for the premium deferral, wherein the insurance policy is eligible for the premium deferral if the issue date of the insurance policy is within the predetermined first time frame and the amount of premiums paid is at least a predetermined amount for the predetermined second time frame; and
   automatically deferring at least one insurance premium payment if the insurance policy is eligible for the premium deferral and the premium deferral is selected comprising:
      adjusting a payment schedule for the insurance policy by rescheduling the at least one insurance premium payment; and
      maintaining the insurance policy such that the insurance policy does not lapse.

2. The method of claim 1, wherein the one or more computer databases also contain a cash value of the insurance policy, wherein the step of determining whether the insurance policy is eligible for the premium deferral further comprises computing whether the cash value is inadequate for an automatic premium loan and computing whether there is an outstanding loan balance for the insurance policy, and wherein the insurance policy is eligible for the premium deferral if the cash value is inadequate for the automatic premium loan and there is no outstanding loan balance for the insurance policy.

3. The method of claim 2, wherein the predetermined first time frame is between twelve months and four years.

4. The method of claim 3, wherein the predetermined second time frame is less than eighteen months.

5. The method of claim 4, wherein the amount of premiums paid comprises seventy-five percent of premiums for the predetermined second time frame.

6. The method of claim 1, wherein automatically producing the notification of eligibility for the insurance policy comprises storing an electronic notification in an electronic file.

7. A method for administering an insurance policy premium payment deferral plan that maintains an insurance policy in effect while permitting deferment of premium payments owed under the policy, the method comprising:
   automatically determining whether an insurance policy has entered a grace period for payment of a premium;
   determining by utilizing a computer whether the insurance policy is eligible for a premium deferral if the insurance policy has entered the grace period, comprising:
      accessing one or more computer databases containing an issue date of the insurance policy, a predetermined first time frame, a predetermined second time frame, and premium payment data;
      computing whether the issue date of the insurance policy is within the predetermined first time frame prior to a premium deferral determination time; and
      computing an amount of premiums paid within the predetermined second time frame prior to the premium deferral determination time using the premium payment data;
   automatically producing a notification of eligibility for the insurance policy if the insurance policy is eligible for the premium deferral, wherein the insurance policy is eligible for the premium deferral if the issue date of the insurance policy is within the predetermined first time frame and the amount of premiums paid is at least a predetermined amount for the predetermined second time frame; and
   automatically deferring an at least one insurance premium payment if the insurance policy is eligible for the premium deferral and the premium deferral is selected comprising:
      adjusting a payment schedule for the insurance policy by rescheduling the at least one insurance premium payment; and
      maintaining the insurance policy such that the insurance policy does not lapse.

8. The method of claim 7, wherein the one or more computer databases also contain a cash value of the insurance policy, wherein determining whether the insurance policy is eligible for the premium deferral further comprises computing whether the cash value is inadequate for an automatic premium loan and computing whether there is an outstanding loan balance for the insurance policy, and wherein the insurance policy is eligible for the premium deferral if the cash value is inadequate for the automatic premium loan and there is no outstanding loan balance for the insurance policy.

9. The method of claim 8, wherein the predetermined first time frame is between twelve months and four years.

10. The method of claim 9, wherein the predetermined second time frame is less than eighteen months.

11. The method of claim 10, wherein the amount of premiums paid comprises seventy-five percent of premiums for the predetermined second time frame.

12. The method of claim 7, further comprising automatically selecting the premium deferral for the insurance policy before the end of the grace period.

13. A non-transitory computer-readable medium storing a computer program for administering an insurance policy premium payment deferral plan that maintains an insurance policy in effect while permitting deferment of premium payments owed under the policy, the non-transitory computer-readable medium comprising code stored therein, wherein the code in response to execution by a computer processor causes the computer processor to execute:

a first executable code determining whether an insurance policy is eligible for a premium deferral, wherein the first executable code is configured for accessing one or more computer databases containing an issue date of the insurance policy, a predetermined first time frame, a predetermined second time frame, and premium payment data, computing whether the issue date of the insurance policy is within the predetermined first time frame prior to a premium deferral determination time and computing an amount of premiums paid within the predetermined second time frame prior to the premium deferral determination time using the premium payment data;

a second executable code producing a notification of eligibility for the insurance policy if the insurance policy is eligible for the premium deferral, wherein the insurance policy is eligible for the premium deferral if the issue date of the insurance policy is within the predetermined first time frame and the predetermined amount of premiums paid is at least a predetermined amount for the predetermined second time frame; and a third executable code automatically deferring at least one insurance premium payment if the insurance policy is eligible for the premium deferral and the premium deferral is selected, wherein the third executable code is configured for adjusting a payment schedule for the insurance policy by rescheduling the at least one insurance premium payment and maintaining the insurance policy such that the insurance policy does not lapse.

14. The computer-readable medium of claim 13, further comprising a fourth executable code determining whether an insurance policy has entered a grace period for payment of a premium, wherein the fourth executable code is executed before the first executable code and wherein the first executable code is executed only if the insurance policy has entered the grace period.

15. The computer-readable medium of claim 14, wherein the second executable code is further configured for automatically selecting the premium deferral for the insurance policy before the end of the grace period.

16. The computer-readable medium of claim 13, wherein the second executable code is further configured for storing an electronic notification in an electronic file.

17. The computer-readable medium of claim 13, wherein the one or more computer databases also contain a cash value of the insurance policy, wherein the first executable code is further configured for computing whether the cash value is inadequate for an automatic premium loan and computing whether there is an outstanding loan balance for the insurance policy, and wherein the insurance policy is eligible for the premium deferral if the cash value is inadequate for the automatic premium loan and there is no outstanding loan balance for the insurance policy.

* * * * *